(12) United States Patent
Lin et al.

(10) Patent No.: US 10,151,900 B2
(45) Date of Patent: *Dec. 11, 2018

(54) PLASTIC BARREL, IMAGING LENS MODULE AND ELECTRONIC DEVICE

(71) Applicant: LARGAN PRECISION CO., LTD., Taichung (TW)

(72) Inventors: Cheng-Feng Lin, Taichung (TW); Ming-Ta Chou, Taichung (TW); Wei-Hung Weng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 102 days.

This patent is subject to a terminal disclaimer.

(21) Appl. No.: 15/241,111

(22) Filed: Aug. 19, 2016

(65) Prior Publication Data

US 2018/0003916 A1    Jan. 4, 2018

(30) Foreign Application Priority Data

Jun. 30, 2016    (TW) .............................. 105209911 U

(51) Int. Cl.
*G02B 7/02*    (2006.01)

(52) U.S. Cl.
CPC ............. *G02B 7/021* (2013.01); *G02B 7/022* (2013.01)

(58) Field of Classification Search
CPC .......... G02B 7/00; G02B 7/021; G02B 7/003; G02B 7/02; G02B 7/10; G02B 13/0045;

(Continued)

(56) References Cited

U.S. PATENT DOCUMENTS 3,402,003 A * 9/1968 McFarland ............ G02B 7/021
                                                        359/601
3,562,513 A * 2/1971 Jaffe ........................ F21S 8/04
                                                        362/305

(Continued)

FOREIGN PATENT DOCUMENTS

| TW | M481412 U | 7/2014 |
| TW | M517334 U | 2/2016 |
| TW | M519751 U | 4/2016 |

OTHER PUBLICATIONS

Shiou et al "Freeform surface finish of plastic injection mold by using ball-burnishing process", Journal of Materials Processing Technology 140 (2003) 248-254.*

*Primary Examiner* — Jie Lei
(74) *Attorney, Agent, or Firm* — McClure, Qualey & Rodack, LLP

(57) ABSTRACT

A plastic barrel includes an object-end portion, an image-end portion, a tube portion and a plurality of wedge structures. The object-end portion includes an outer object-end surface, an object-end hole and an inner annular object-end surface. The image-end portion includes an outer image-end surface, an image-end opening and an inner annular image-end surface. The tube portion connects the object-end portion and the image-end portion, and includes a plurality of inclined surfaces. The wedge structures are disposed on at least one surface of the inner annular object-end surface, the inner annular image-end surface and the inclined surfaces, wherein the wedge structures are regularly arranged around the central axis, and each of the wedge structures includes an acute end and a tapered section. The tapered section connects the surface, which the wedge structure is disposed on, and the acute end.

20 Claims, 14 Drawing Sheets

(58) Field of Classification Search
CPC .... G02B 13/00; G02B 27/0018; G02B 27/00; G02B 5/0278; G02B 7/022; G03B 11/04; G03B 17/12
USPC .......... 359/601, 611, 740, 703, 704
See application file for complete search history.

(56) References Cited

U.S. PATENT DOCUMENTS

| | | | |
|---|---|---|---|
| 4,488,776 A * | 12/1984 | Skinner | G02B 7/022 359/808 |
| 7,626,773 B2 | 12/2009 | Noda et al. | |
| 9,354,444 B2 | 5/2016 | Lin | |

\* cited by examiner

PLASTIC BARREL, IMAGING LENS MODULE AND ELECTRONIC DEVICE

RELATED APPLICATIONS

This application claims priority to Taiwan Application Serial Number 105209911, filed Jun. 30, 2016, which is herein incorporated by reference.

BACKGROUND

Technical Field

The present disclosure relates to a plastic barrel and an imaging lens module. More particularly, the present disclosure relates to a plastic barrel and an imaging lens module which are applicable to portable electronic devices.

Description of Related Art

Due to the popularity of personal electronic products and mobile communication products having camera functionalities, such as smart phones and tablet personal computers, the demand for compact imaging lens modules has been increasing and the requirements for high resolution and image quality of present compact imaging lens modules increase significantly.

A plastic barrel is generally used to carry lens elements of an imaging lens module and provide an optical space between any two lens elements thereof. A surface property of the plastic barrel relates to an effect of suppressing the stray light. Accordingly, an image quality of the imaging lens module is influenced by the surface property of the plastic barrel.

A conventional plastic barrel is typically formed by an injection molding method and has a smooth and bright surface, which is featured with high reflectivity. As a result, the stray light reflected from the aforementioned surface of the conventional plastic barrel cannot be effectively attenuated.

Another conventional plastic barrel is provided for suppressing the stray light. The conventional plastic barrel is atomized with a surface treatment, so that a reflectivity thereof is reduced. However, the effect of attenuating the stray light is still limited. Therefore, the conventional plastic barrel cannot satisfy the requirements of high-end optical systems with camera functionalities.

Given the above, how to improve the surface property of the plastic barrel for enhancing the image quality of compact imaging lens modules has become one of the important subjects.

SUMMARY

According to one aspect of the present disclosure, a plastic barrel includes an object-end portion, an image-end portion, a tube portion and a plurality of wedge structures. The object-end portion includes an outer object-end surface, an object-end hole and an inner annular object-end surface, which is connected to the outer object-end surface and surrounds the object-end hole. The image-end portion includes an outer image-end surface, an image-end opening and an inner annular image-end surface, which is connected to the outer image-end surface and surrounds the image-end opening. The tube portion connects the object-end portion and the image-end portion, and includes a plurality of inclined surfaces, wherein an angle is between each of the inclined surfaces and a central axis of the plastic barrel. The wedge structures are disposed on at least one surface of the inner annular object-end surface, the inner annular image-end surface and the inclined surfaces, wherein the wedge structures are regularly arranged around the central axis, and each of the wedge structures includes an acute end and a tapered section. The tapered section connects the surface, which the wedge structure is disposed on, and the acute end.

According to another aspect of the present disclosure, an imaging lens module includes the plastic barrel according to the foregoing aspect and an optical lens assembly, which is disposed in the plastic barrel and includes at least one lens element.

According to another aspect of the present disclosure, an electronic device includes the imaging lens module according to the foregoing aspect.

BRIEF DESCRIPTION OF THE DRAWINGS

FIG. 10 is a schematic view of the parameters h and $\theta$ according to the 1st embodiment;

DETAILED DESCRIPTION

<1st Embodiment>

Figure 1A:
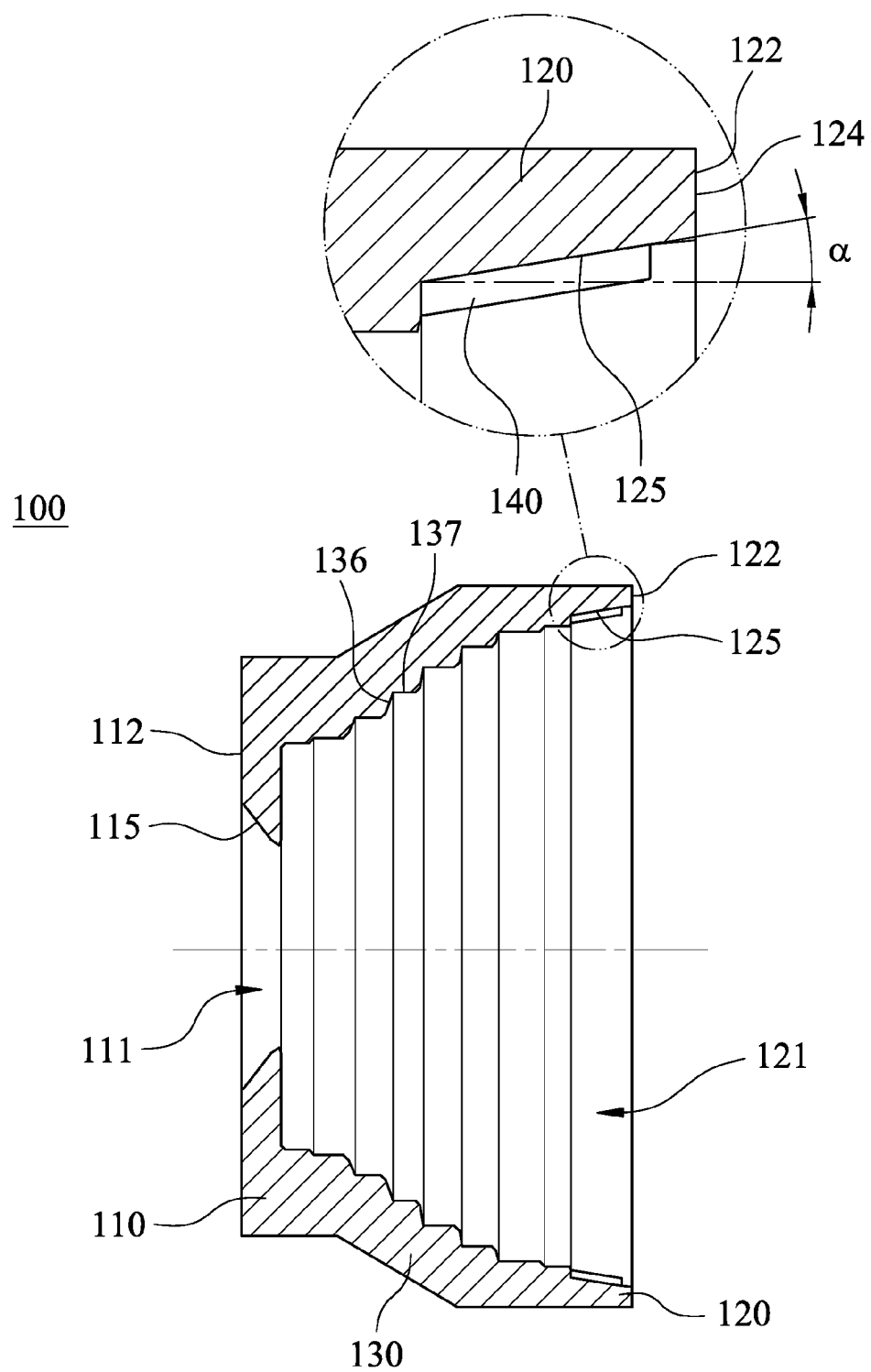
FIG. 1A is a schematic view of a plastic barrel according to the 1st embodiment of the present disclosure.
Figure 1B:
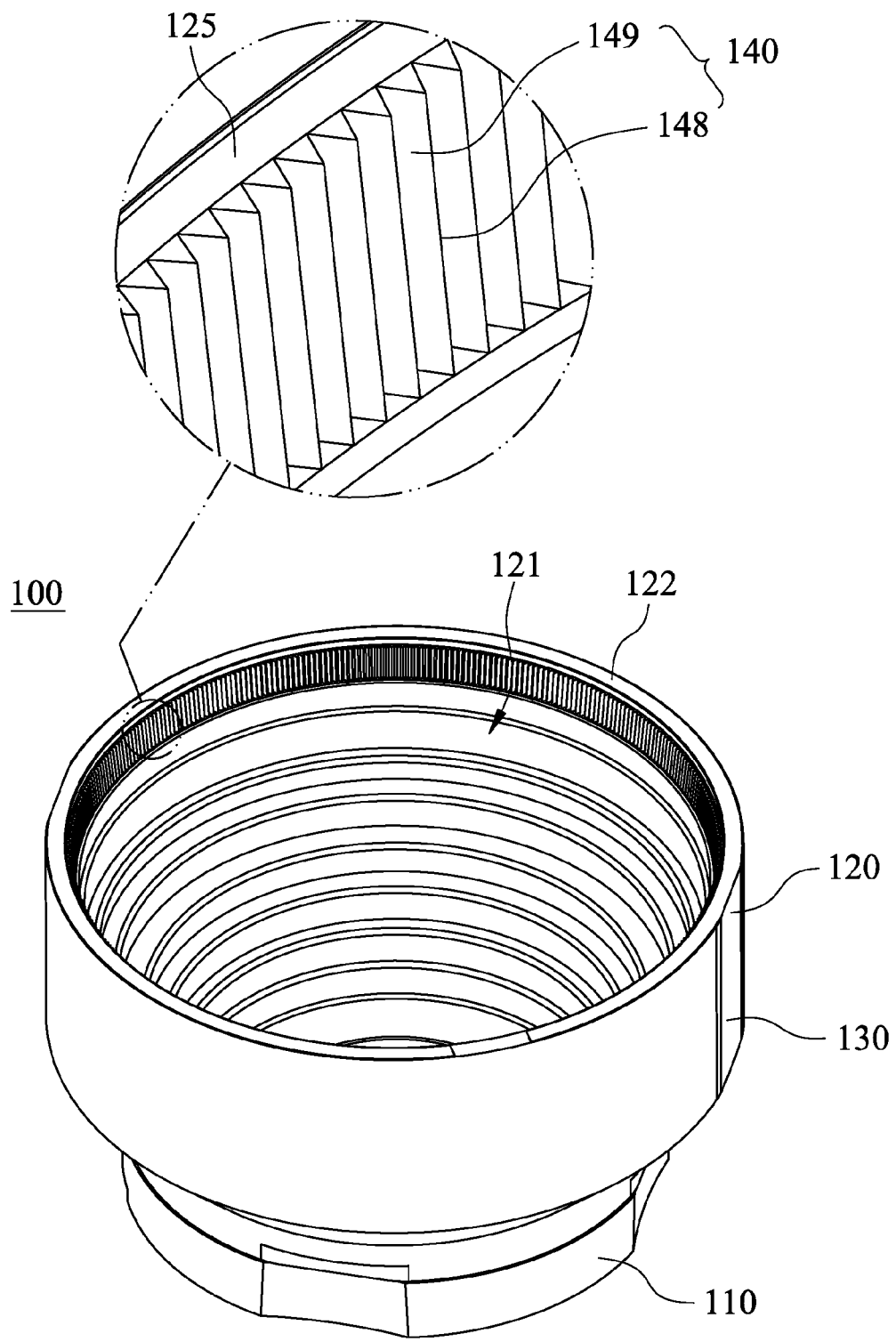
FIG. 1B is a three-dimensional view of the plastic barrel according to the 1st embodiment.

FIG. 1A is a schematic view of a plastic barrel 100 according to the 1st embodiment of the present disclosure, and FIG. 1B is a three-dimensional view of the plastic barrel 100 according to the 1st embodiment. In FIG. 1A and FIG. 1B, the plastic barrel 100 includes an object-end portion 110, an image-end portion 120, a tube portion 130 and a plurality of wedge structures 140.

The object-end portion 110 includes an outer object-end surface 112, an object-end hole 111 and an inner annular object-end surface 115. The outer object-end surface 112 is a surface facing an imaged object (not shown herein) of the plastic barrel 100. The inner annular object-end surface 115 is connected to the outer object-end surface 112, surrounds the object-end hole 111, and faces a central axis of the plastic barrel 100.

The image-end portion 120 includes an outer image-end surface 122, an image-end opening 121 and an inner annular image-end surface 125. The outer image-end surface 122 is a surface facing an image surface (not shown herein) of the plastic barrel 100. The inner annular image-end surface 125 is connected to the outer image-end surface 122, surrounds the image-end opening 121, and faces the central axis of the plastic barrel 100.

The tube portion 130 connects the object-end portion 110 and the image-end portion 120, and surrounds the central axis of the plastic barrel 100. The tube portion 130 includes a plurality of inclined surfaces 136 facing the central axis of the plastic barrel 100, wherein an angle is between each of the inclined surfaces 136 and the central axis. The aforementioned angle is greater than 0 degrees and smaller than 90 degrees. That is, the inclined surfaces 136 are neither parallel nor orthogonal to the central axis of the plastic barrel 100.

In other words, the object-end portion 110 is extended from a part of the plastic barrel 100 for disposing an optical element closest to the imaged object towards the imaged object (the part of the plastic barrel 100 for disposing the optical element closest to the imaged object not included in the object-end portion 110). The image-end portion 120 is extended from a part of the plastic barrel 100 for disposing an optical element closest to the image surface towards the image surface (the part of the plastic barrel 100 for disposing the optical element closest to the image surface not included in the image-end portion 120). The aforementioned optical elements can be lens elements, spacers or light blocking sheets . . . etc. The tube portion 130 is between the object-end portion 110 and the image-end portion 120 of the plastic barrel 100.

The wedge structures 140 are disposed on at least one surface of the inner annular object-end surface 115, the inner annular image-end surface 125 and the inclined surfaces 136, wherein the wedge structures 140 are regularly arranged around the central axis, and each of the wedge structures 140 includes an acute end 148 and a tapered section 149. The tapered section 149 connects the surface, which the wedge structure 140 is disposed on, and the acute end 148. Therefore, it is favorable for effectively attenuating the stray light reflected from the aforementioned surface of the plastic barrel 100 so as to enhance the image quality of the imaging lens module. In the 1st embodiment, the inner annular image-end surface 125 has a circumferential direction around the central axis of the plastic barrel 100. The wedge structures 140 with the same geometric structures are disposed on the inner annular image-end surface 125, and regularly arranged with the same spaces along the circumferential direction of the inner annular image-end surface 125. Furthermore, each of the wedge structures 140 includes an acute end 148 and a tapered section 149. The tapered section 149 connects the inner annular image-end surface 125 and the acute end 148. In other embodiments (not shown herein), the wedge structures can be disposed on at least one surface of the inner annular object-end surface, the inner annular image-end surface and the inclined surfaces, or a combination thereof, wherein the wedge structures are regularly arranged around the central axis.

In detail, the plastic barrel 100 with the wedge structures 140 can be formed integrally. Therefore, it is favorable for producing the wedge structures 140 more easily.

The wedge structures 140 can be only disposed on the inner annular image-end surface 125. Therefore, it is favorable for reducing the occurrence of stray light total reflection from the lens elements, wherein the occurrence could not be effectively reduced by the lens elements with coating. In the 1st embodiment, the wedge structures 140 is only disposed on the inner annular image-end surface 125.

A number of the wedge structures 140 can be greater than or equal to 80, and smaller than or equal to 420. Therefore, it is favorable for obtaining proper denseness of the wedge structures 140 so as to reduce the stray light reflection and maintain the manufacturability of the plastic barrel 100. Preferably, the number of the wedge structures 140 can be greater than or equal to 150, and smaller than or equal to 360. Therefore, it is favorable for further enhancing the manufacturability of the plastic barrel 100. In the 1st embodiment, the number of the wedge structures 140 is 240, wherein the wedge structures 140 are disposed on the inner annular image-end surface 125 and regularly arranged around the central axis of the plastic barrel 100.

FIG. 10 is a schematic view of the parameters h and θ according to the 1st embodiment. That is, FIG. 10 is a side view from the image-end portion 120 of the plastic barrel 100. In FIG. 10, when an angle between any two wedge structures 140 adjacent to each other is θ, the following condition can be satisfied: 35 degrees<θ<90 degrees. Therefore, it is favorable for absorbing the stray light of the wedge structures 140. Preferably, the following condition can be satisfied: 45 degrees<θ<75 degrees. Therefore, it is favorable for maintaining the structural quality of the wedge structures 140 in mass production.

When a distance between the inner annular image-end surface 125, which the wedge structure 140 is disposed on, and the acute end 148 of each of the wedge structures 140 is h, the following condition can be satisfied: 0.03 mm<h<0.25 mm. The aforementioned distance is between a middle point of a base (located on the inner annular image-end surface 125) and a vertex (located on the acute end 148) of a triangle of a cross-section orthogonal to the central axis of each of the wedge structures 140. Therefore, it is favorable for obtaining a deeper structural depth of the wedge structures 140 so as to enhance the effect of absorbing the stray light. Preferably, the following condition can be satisfied: 0.04 mm<h<0.15 mm. Therefore, it is favorable for maintaining the effect of absorbing the stray light and satisfying the requirements of mass production of the wedge structures 140.

The cross-section orthogonal to the central axis of each of the wedge structures 140 can be isosceles triangle. Therefore, it is favorable for simplifying the mold machining complexity of the wedge structures 140. In the 1st embodiment, the cross-section orthogonal to the central axis of each of the wedge structures 140 is isosceles triangle.

In FIG. 1B, an entire surface of the acute end 148 and an entire surface of the tapered section 149 of each of the wedge structures 140 can be both smooth surfaces. Therefore, it is favorable for reducing process steps of the mold machining of the wedge structures 140 by without the atomization process.

In FIG. 1A, an outer diameter of the image-end portion 120 can be greater than a distance parallel to the central axis between the outer object-end surface 112 and the outer image-end surface 122. Therefore, it is favorable for the plastic barrel 100 to be applicable to the imaging lens modules with short total track length and high pixels such as 12 MP (Mega Pixels), 16 MP, 20 MP, 23 MP and 30 MP, but not limited thereto. In the 1st embodiment, the outer diameter of the image-end portion 120 is 7.1 mm. The distance parallel to the central axis between the outer object-end surface 112 and the outer image-end surface 122 is 3.84 mm. Hence, the outer diameter of the image-end portion 120 is greater than the distance parallel to the central axis between the outer object-end surface 112 and the outer image-end surface 122.

When an angle between the inner annular image-end surface 125 and the central axis of the plastic barrel 100 is α, the following condition can be satisfied: 1.0 degrees<α<27.0 degrees. Therefore, it is favorable for the wedge structures 140 to have the release angles suitable for injection molding method. Preferably, the following condition can be satisfied: 3.0 degrees<α<19.0 degrees. Therefore, it is favorable for obtaining the release angles suitable for injection molding method of the wedge structures 140, and maintaining a proper thickness of the plastic barrel 100.

The outer image-end surface 122 can include a light diminishing surface 124. When a surface roughness of the light diminishing surface 124 is Ra, the following condition can be satisfied: 0.1 μm<Ra<4.0 μm. Therefore, it is favorable for reducing distortion of the wedge structures 140 during mold release.

The tube portion 130 can further include a plurality of parallel surfaces 137 parallel to and facing the central axis of the plastic barrel 100, wherein a number of the parallel surfaces 137 can be at least six. Therefore, it is favorable for the plastic barrel 100 to be applicable to the imaging lens module featured with single-focus and more lens elements. In the 1st embodiment, the number of the parallel surfaces 137 is eight.

Figure 1C:
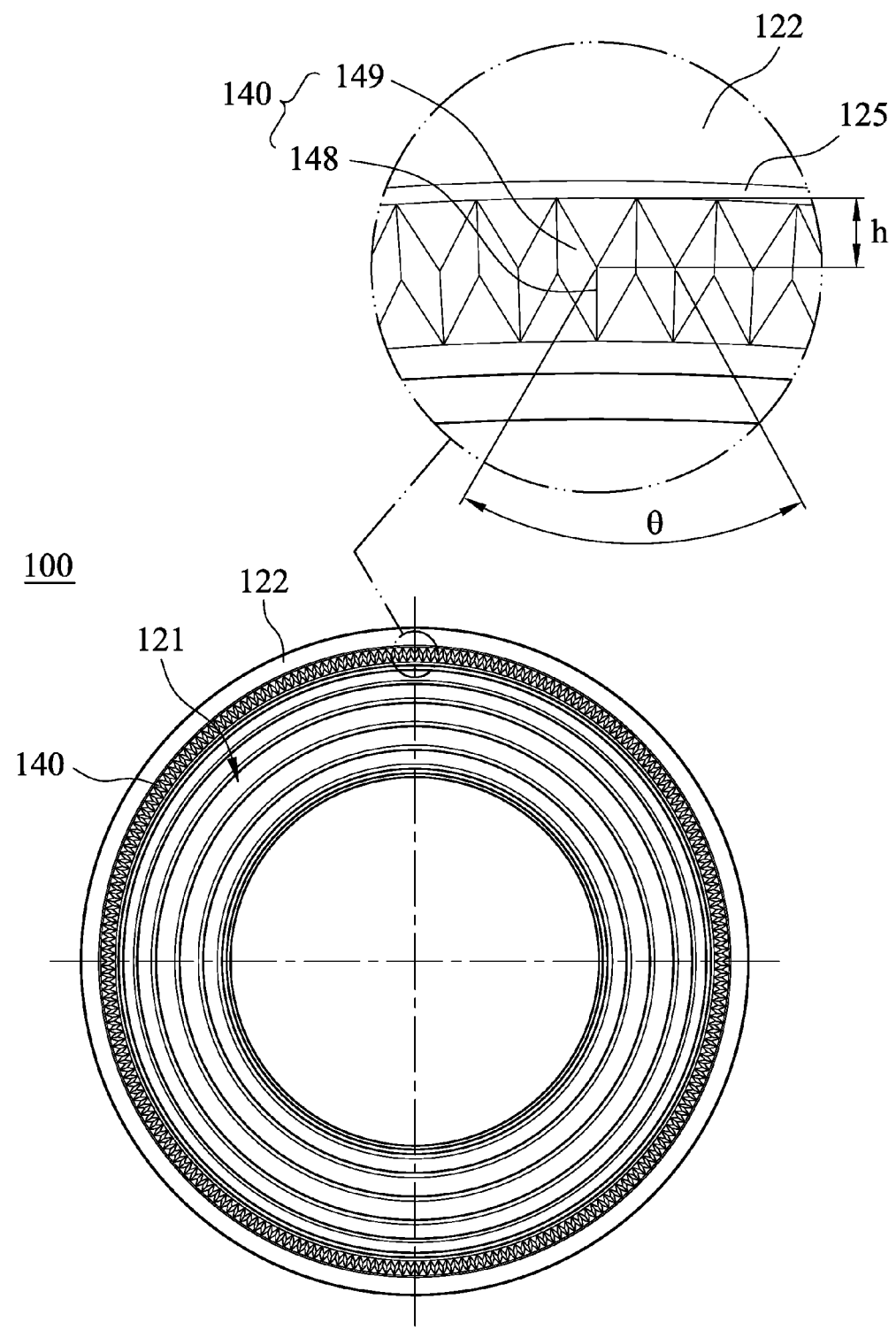

The data of the aforementioned parameters of the plastic barrel 100 according to the 1st embodiment of the present disclosure are listed in the following Table 1, wherein the parameters are also shown as FIG. 1A and FIG. 1C.

TABLE 1

| 1st Embodiment | |
|---|---|
| θ (deg.) | 58.5 |
| h (mm) | 0.074 |
| α (deg.) | 9.355 |
| Ra (μm) | 0.4~1.12 |

<2nd Embodiment>

Figure 2A:
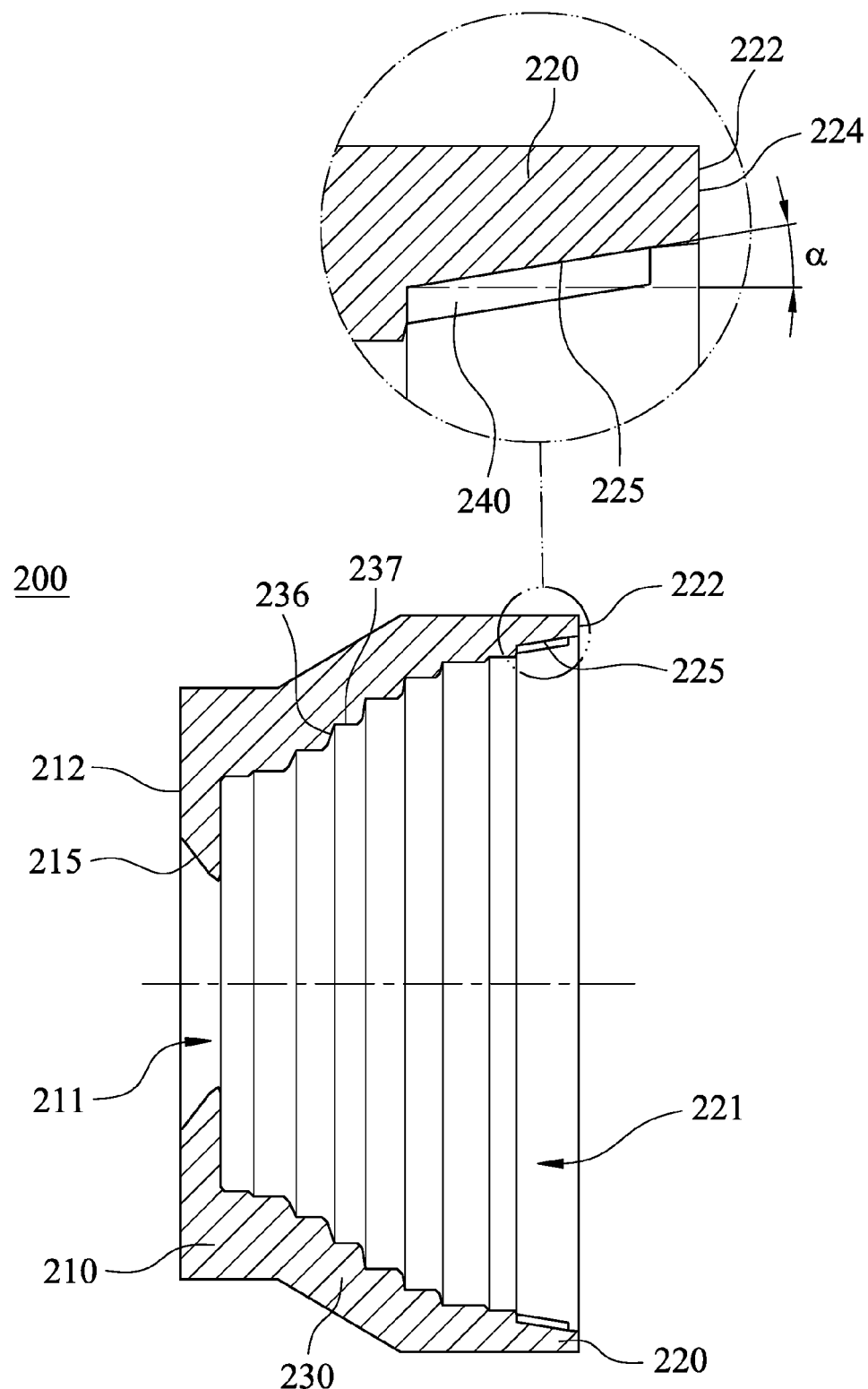
FIG. 2A is a schematic view of a plastic barrel according to the 2nd embodiment of the present disclosure.

FIG. 2A is a schematic view of a plastic barrel 200 according to the 2nd embodiment of the present disclosure. In FIG. 2A, the plastic barrel 200 includes an object-end portion 210, an image-end portion 220, a tube portion 230 and a plurality of wedge structures 240.

The object-end portion 210 includes an outer object-end surface 212, an object-end hole 211 and an inner annular object-end surface 215. The outer object-end surface 212 is a surface facing an imaged object (not shown herein) of the plastic barrel 200. The inner annular object-end surface 215 is connected to the outer object-end surface 212, surrounds the object-end hole 211, and faces a central axis of the plastic barrel 200.

The image-end portion 220 includes an outer image-end surface 222, an image-end opening 221 and an inner annular image-end surface 225. The outer image-end surface 222 is a surface facing an image surface (not shown herein) of the plastic barrel 200. The inner annular image-end surface 225 is connected to the outer image-end surface 222, surrounds the image-end opening 221, and faces the central axis of the plastic barrel 200.

The tube portion 230 connects the object-end portion 210 and the image-end portion 220, and surrounds the central axis of the plastic barrel 200. The tube portion 230 includes a plurality of inclined surfaces 236 facing the central axis of the plastic barrel 200, wherein an angle is between each of the inclined surfaces 236 and the central axis. The afore-mentioned angle is greater than 0 degrees and smaller than 90 degrees. That is, the inclined surfaces 236 are neither parallel nor orthogonal to the central axis of the plastic barrel 200.

Figure 2B:
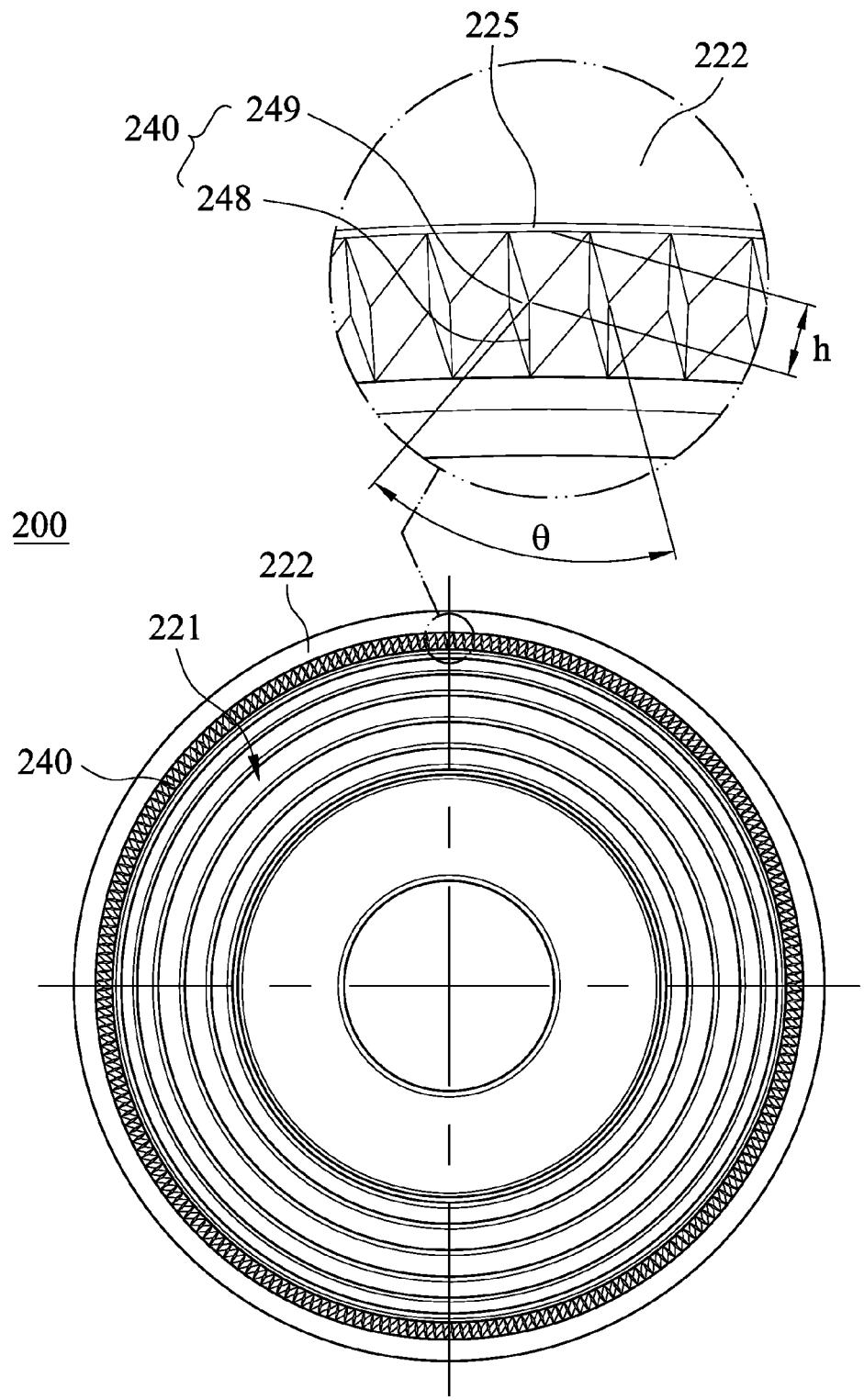
FIG. 2B is a schematic view of the parameters h and $\theta$ according to the 2nd embodiment.

FIG. 2B is a schematic view of the parameters h and θ according to the 2nd embodiment. That is, FIG. 2B is a side view from the image-end portion 220 of the plastic barrel 200. In FIG. 2A and FIG. 2B, the inner annular image-end surface 225 has a circumferential direction around the central axis of the plastic barrel 200. The wedge structures 240 with the same geometric structures are disposed on the inner annular image-end surface 225, and regularly arranged with the same spaces along the circumferential direction of the inner annular image-end surface 225. Furthermore, each of the wedge structures 240 includes an acute end 248 and a tapered section 249. The tapered section 249 connects the inner annular image-end surface 225, which the wedge structure 240 is disposed on, and the acute end 248.

In detail, the plastic barrel 200 with the wedge structures 240 is formed integrally. The wedge structures 240 is only disposed on the inner annular image-end surface 225. A number of the wedge structures 240 is 240, wherein the wedge structures 240 are disposed on the inner annular image-end surface 225 and regularly arranged around the central axis of the plastic barrel 200. An entire surface of the acute end 248 and an entire surface of the tapered section 249 of each of the wedge structures 240 are both smooth surfaces.

In FIG. 2A, an outer diameter of the image-end portion 220 is greater than a distance parallel to the central axis between the outer object-end surface 212 and the outer image-end surface 222. The outer image-end surface 222 includes a light diminishing surface 224.

The tube portion 230 further includes a plurality of parallel surfaces 237 parallel to and facing the central axis of the plastic barrel 200, wherein a number of the parallel surfaces 237 is eight.

The data of the parameters θ, h, α and Ra of the plastic barrel 200 according to the 2nd embodiment of the present disclosure are listed in the following Table 2, wherein the parameters are also shown as FIG. 2A and FIG. 2B. The definitions of these parameters shown in Table 2 are the same as those stated in the plastic barrel 100 of the 1st embodiment with corresponding values for the plastic barrel 200.

TABLE 2

| 2nd Embodiment | |
|---|---|
| θ (deg.) | 55.6 |
| h (mm) | 0.077 |
| α (deg.) | 9.355 |
| Ra (μm) | 0.56~0.8 |

<3rd Embodiment>

Figure 3A:
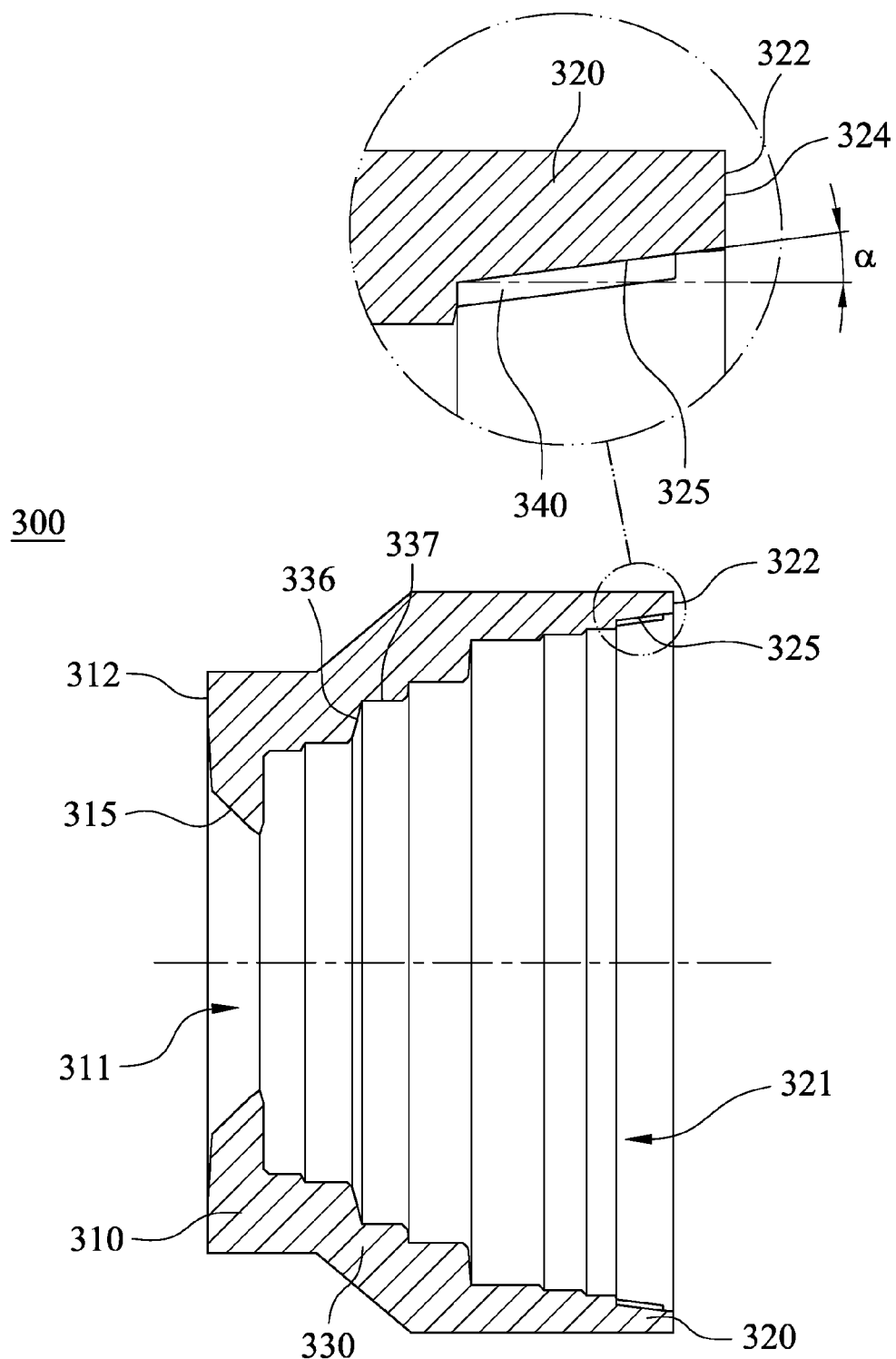
FIG. 3A is a schematic view of a plastic barrel according to the 3rd embodiment of the present disclosure.

FIG. 3A is a schematic view of a plastic barrel 300 according to the 3rd embodiment of the present disclosure. In FIG. 3A, the plastic barrel 300 includes an object-end portion 310, an image-end portion 320, a tube portion 330 and a plurality of wedge structures 340.

The object-end portion 310 includes an outer object-end surface 312, an object-end hole 311 and an inner annular object-end surface 315. The outer object-end surface 312 is a surface facing an imaged object (not shown herein) of the plastic barrel 300. The inner annular object-end surface 315 is connected to the outer object-end surface 312, surrounds the object-end hole 311, and faces a central axis of the plastic barrel 300.

The image-end portion 320 includes an outer image-end surface 322, an image-end opening 321 and an inner annular image-end surface 325. The outer image-end surface 322 is a surface facing an image surface (not shown herein) of the plastic barrel 300. The inner annular image-end surface 325 is connected to the outer image-end surface 322, surrounds the image-end opening 321, and faces the central axis of the plastic barrel 300.

The tube portion 330 connects the object-end portion 310 and the image-end portion 320, and surrounds the central axis of the plastic barrel 300. The tube portion 330 includes a plurality of inclined surfaces 336 facing the central axis of the plastic barrel 300, wherein an angle is between each of the inclined surfaces 336 and the central axis. The aforementioned angle is greater than 0 degrees and smaller than 90 degrees. That is, the inclined surfaces 336 are neither parallel nor orthogonal to the central axis of the plastic barrel 300.

Figure 3B:
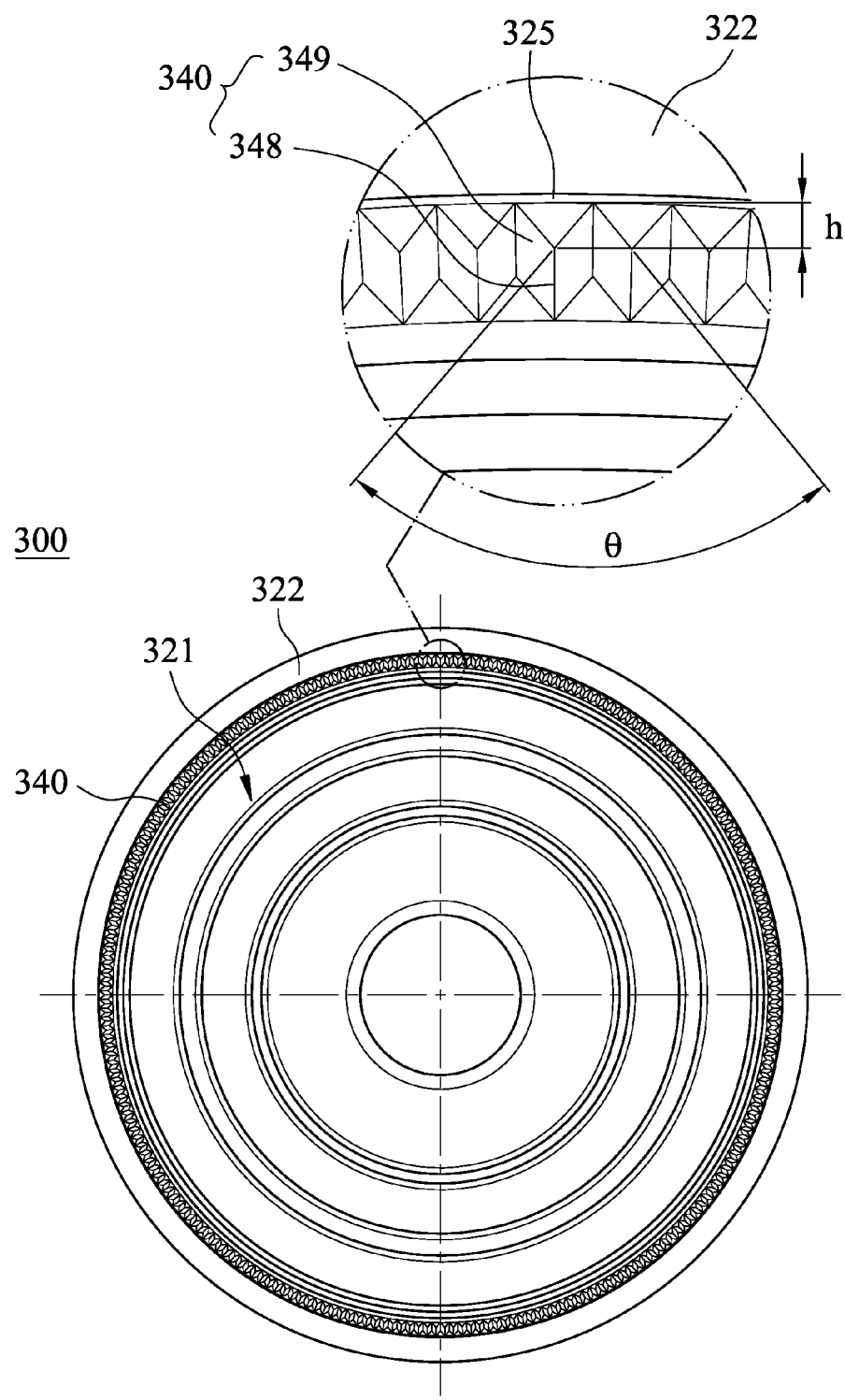
FIG. 3B is a schematic view of the parameters h and $\theta$ according to the 3rd embodiment.

FIG. 3B is a schematic view of the parameters h and θ according to the 3rd embodiment. That is, FIG. 3B is a side view from the image-end portion 320 of the plastic barrel 300. In FIG. 3A and FIG. 3B, the inner annular image-end surface 325 has a circumferential direction around the central axis of the plastic barrel 300. The wedge structures 340 with the same geometric structures are disposed on the inner annular image-end surface 325, and regularly arranged with the same spaces along the circumferential direction of the inner annular image-end surface 325. Furthermore, each of the wedge structures 340 includes an acute end 348 and a tapered section 349. The tapered section 349 connects the inner annular image-end surface 325, which the wedge structure 340 is disposed on, and the acute end 348.

In detail, the plastic barrel 300 with the wedge structures 340 is formed integrally. The wedge structures 340 is only disposed on the inner annular image-end surface 325. A cross-section orthogonal to the central axis of each of the wedge structures 340 is isosceles triangle. A number of the wedge structures 340 is 360, wherein the wedge structures 340 are disposed on the inner annular image-end surface 325 and regularly arranged around the central axis of the plastic barrel 300. An entire surface of the acute end 348 and an entire surface of the tapered section 349 of each of the wedge structures 340 are both smooth surfaces.

In FIG. 3A, an outer diameter of the image-end portion 320 is greater than a distance parallel to the central axis between the outer object-end surface 312 and the outer image-end surface 322. The outer image-end surface 322 includes a light diminishing surface 324.

The tube portion 330 further includes a plurality of parallel surfaces 337 parallel to and facing the central axis of the plastic barrel 300, wherein a number of the parallel surfaces 337 is seven.

The data of the parameters θ, h, α and Ra of the plastic barrel 300 according to the 3rd embodiment of the present disclosure are listed in the following Table 3, wherein the parameters are also shown as FIG. 3A and FIG. 3B. The definitions of these parameters shown in Table 3 are the same as those stated in the plastic barrel 100 of the 1st embodiment with corresponding values for the plastic barrel 300.

TABLE 3

| 3rd Embodiment | |
|---|---|
| θ (deg.) | 80.733 |
| h (mm) | 0.049 |
| α (deg.) | 7.432 |
| Ra (μm) | 1.6~3.15 |

<4th Embodiment>

Figure 4A:
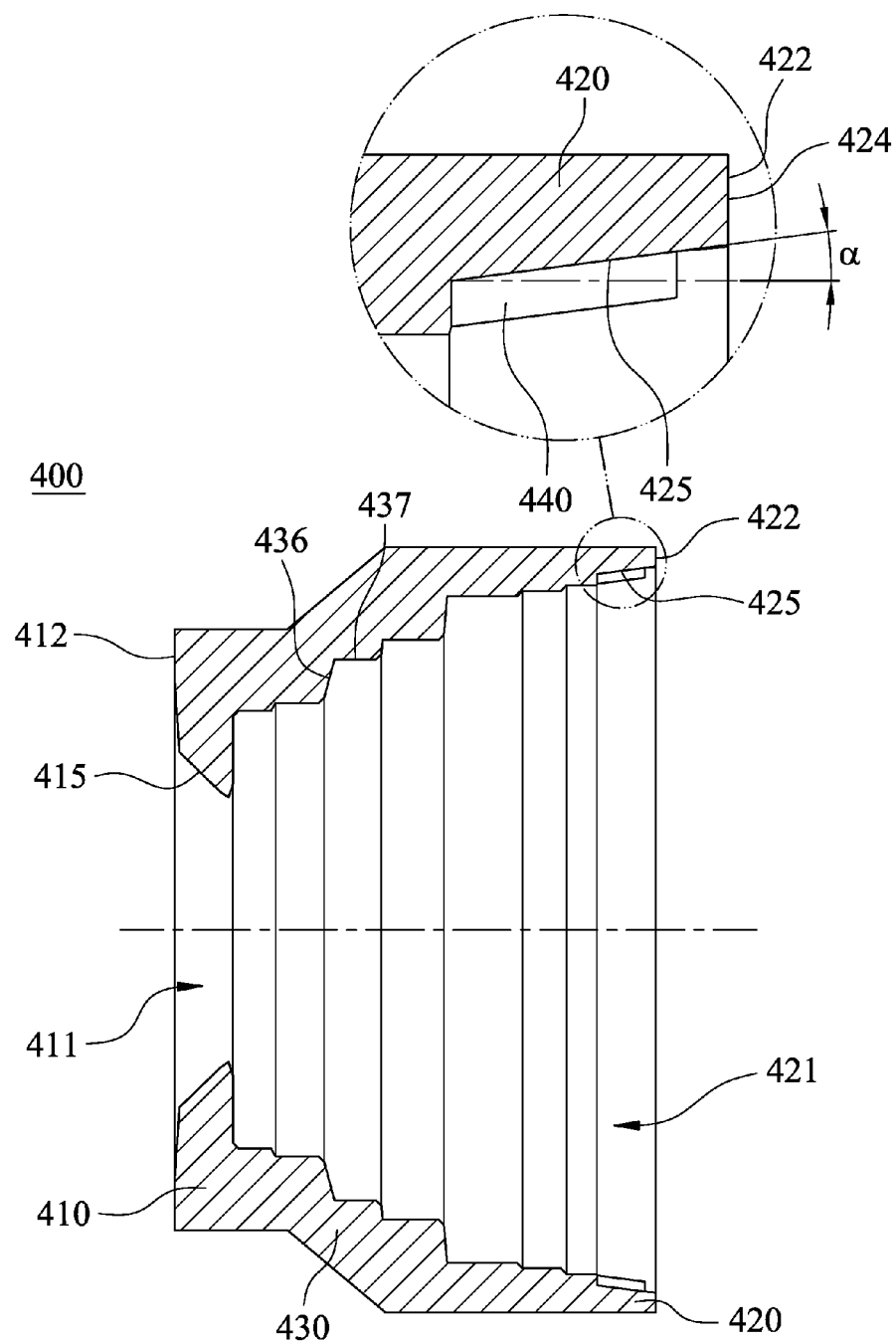
FIG. 4A is a schematic view of a plastic barrel according to the 4th embodiment of the present disclosure.

FIG. 4A is a schematic view of a plastic barrel 400 according to the 4th embodiment of the present disclosure. In FIG. 4A, the plastic barrel 400 includes an object-end portion 410, an image-end portion 420, a tube portion 430 and a plurality of wedge structures 440.

The object-end portion 410 includes an outer object-end surface 412, an object-end hole 411 and an inner annular object-end surface 415. The outer object-end surface 412 is a surface facing an imaged object (not shown herein) of the plastic barrel 400. The inner annular object-end surface 415 is connected to the outer object-end surface 412, surrounds the object-end hole 411, and faces a central axis of the plastic barrel 400.

The image-end portion 420 includes an outer image-end surface 422, an image-end opening 421 and an inner annular image-end surface 425. The outer image-end surface 422 is a surface facing an image surface (not shown herein) of the plastic barrel 400. The inner annular image-end surface 225 is connected to the outer image-end surface 422, surrounds the image-end opening 421, and faces the central axis of the plastic barrel 400.

The tube portion 430 connects the object-end portion 410 and the image-end portion 420, and surrounds the central axis of the plastic barrel 400. The tube portion 430 includes a plurality of inclined surfaces 436 facing the central axis of the plastic barrel 400, wherein an angle is between each of the inclined surfaces 436 and the central axis. The aforementioned angle is greater than 0 degrees and smaller than 90 degrees. That is, the inclined surfaces 436 are neither parallel nor orthogonal to the central axis of the plastic barrel 400.

Figure 4B:
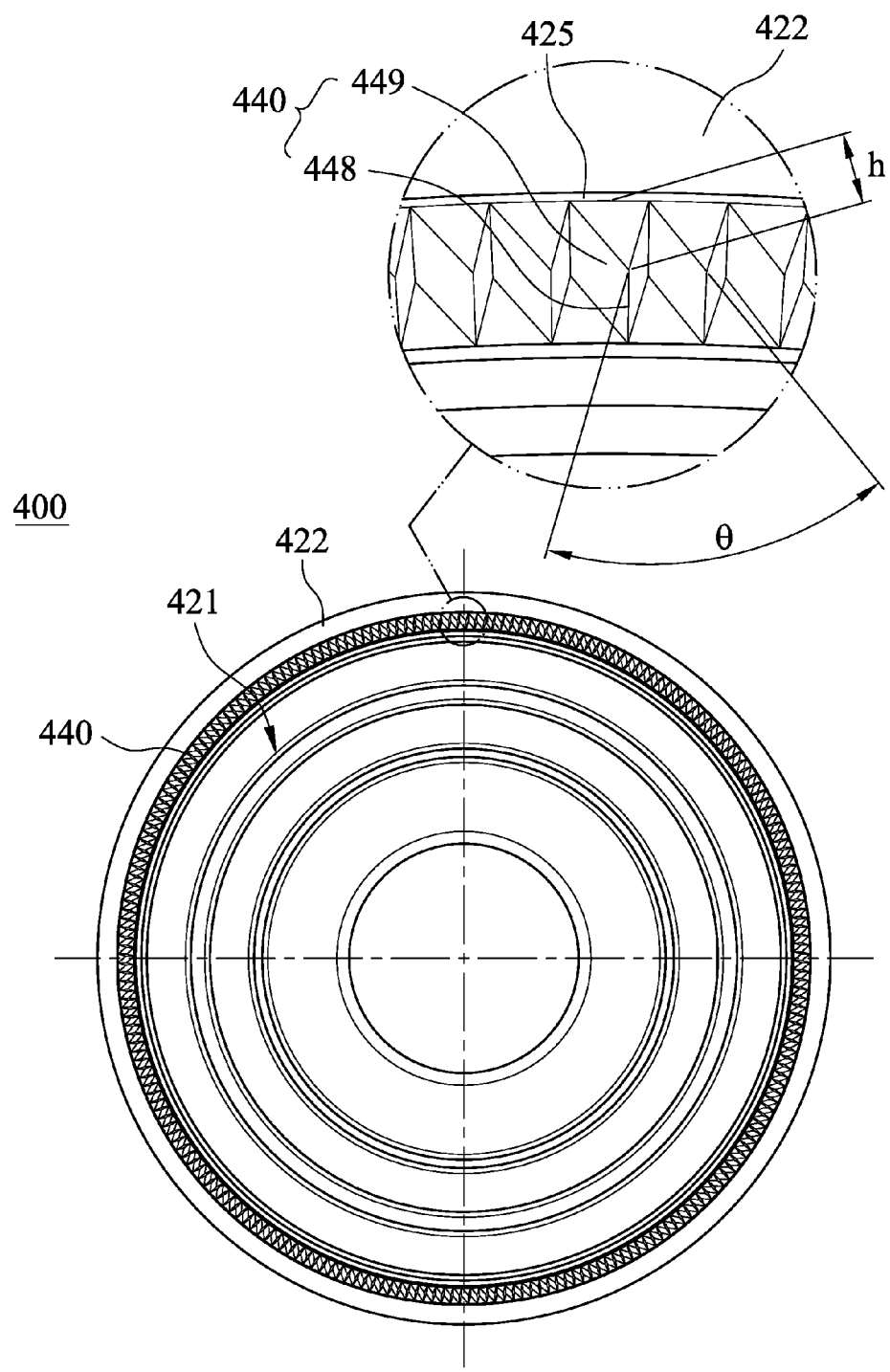
FIG. 4B is a schematic view of the parameters h and $\theta$ according to the 4th embodiment.

FIG. 4B is a schematic view of the parameters h and θ according to the 4th embodiment. That is, FIG. 4B is a side view from the image-end portion 420 of the plastic barrel 400. In FIG. 4A and FIG. 4B, the inner annular image-end surface 425 has a circumferential direction around the central axis of the plastic barrel 400. The wedge structures 440 with the same geometric structures are disposed on the inner annular image-end surface 425, and regularly arranged with the same spaces along the circumferential direction of the inner annular image-end surface 425. Furthermore, each of the wedge structures 440 includes an acute end 448 and a tapered section 449. The tapered section 449 connects the inner annular image-end surface 425, which the wedge structure 440 is disposed on, and the acute end 448.

In detail, the plastic barrel 400 with the wedge structures 440 is formed integrally. The wedge structures 440 is only disposed on the inner annular image-end surface 425. A number of the wedge structures 440 is 200, wherein the wedge structures 440 are disposed on the inner annular image-end surface 425 and regularly arranged around the central axis of the plastic barrel 400. An entire surface of the acute end 448 and an entire surface of the tapered section 449 of each of the wedge structures 440 are both smooth surfaces.

In FIG. 4A, an outer diameter of the image-end portion 420 is greater than a distance parallel to the central axis between the outer object-end surface 412 and the outer image-end surface 422. The outer image-end surface 422 includes a light diminishing surface 424.

The tube portion 430 further includes a plurality of parallel surfaces 437 parallel to and facing the central axis of the plastic barrel 400, wherein a number of the parallel surfaces 437 is seven.

The data of the parameters θ, h, α and Ra of the plastic barrel 400 according to the 4th embodiment of the present disclosure are listed in the following Table 4, wherein the parameters are also shown as FIG. 4A and FIG. 4B. The definitions of these parameters shown in Table 4 are the same as those stated in the plastic barrel 100 of the 1st embodiment with corresponding values for the plastic barrel 400.

TABLE 4

| 4th Embodiment | |
| --- | --- |
| θ (deg.) | 55.6 |
| h (mm) | 0.09 |
| α (deg.) | 7.432 |
| Ra (μm) | 0.8~2.24 |

<5th Embodiment>

Figure 5:
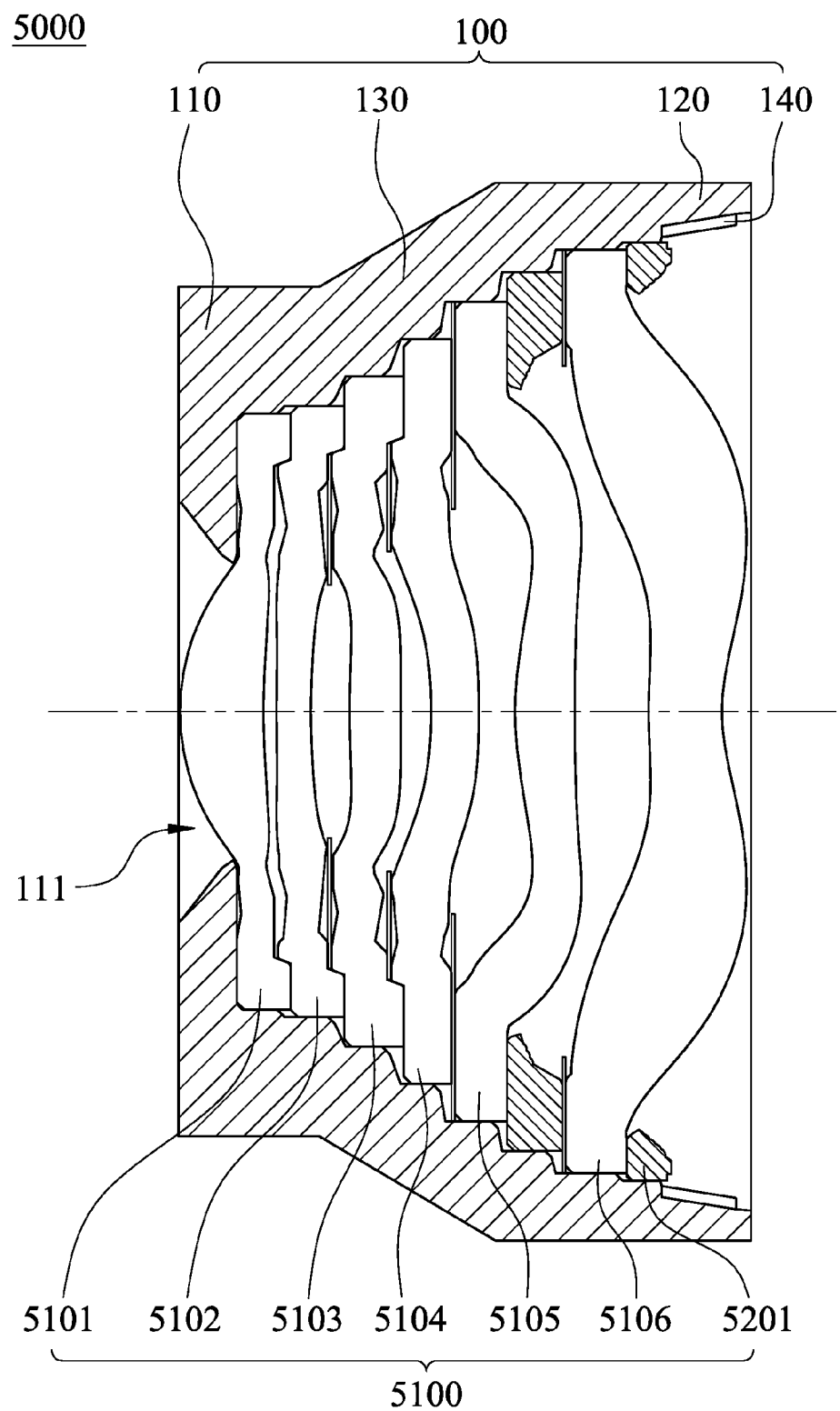
FIG. 5 is a schematic view of an imaging lens module according to the 5th embodiment of the present disclosure.

FIG. 5 is a schematic view of an imaging lens module 5000 according to the 5th embodiment of the present disclosure. In FIG. 5, the imaging lens module 5000 includes the plastic barrel 100 in the aforementioned 1st embodiment and an optical lens assembly 5100.

The optical lens assembly 5100 is disposed in the plastic barrel 100 and includes lens elements (5101-5106). In other embodiments (not shown herein), the optical lens assembly 5100 can be disposed in another plastic barrel according to the present disclosure.

In FIG. 1A to FIG. 1O and FIG. 5, the plastic barrel 100 includes the object-end portion 110, the image-end portion 120, the tube portion 130 and the wedge structures 140. The object-end portion 110 includes the outer object-end surface 112, the object-end hole 111 and the inner annular object-end surface 115. The image-end portion 120 includes the outer image-end surface 122, the image-end opening 121 and the inner annular image-end surface 125. The tube portion 130 connects the object-end portion 110 and the image-end portion 120, and includes the inclined surfaces 136.

In the 5th embodiment, the wedge structures 140 are disposed on the inner annular image-end surface 125 and regularly arranged around the central axis of the plastic barrel 100 (i.e. an optical axis of the imaging lens module 5000). Each of the wedge structures 140 includes the acute end 148 and the tapered section 149. The tapered section 149 connects the inner annular image-end surface 125, which the wedge structure 140 is disposed on, and the acute end 148. Therefore, it is favorable for effectively attenuating the reflected stray light of the imaging lens module 5000 so as to enhance the image quality of the imaging lens module 5000.

Furthermore, the wedge structures 140 can be only disposed on the inner annular image-end surface 125. Therefore, it is favorable for reducing the occurrence of stray light total reflection from lens elements (5101-5106), wherein the occurrence could not be effectively reduced by lens elements (5101-5106) with coating.

The tube portion 130 can further include the parallel surfaces 137 parallel to and facing the central axis of the plastic barrel 100, wherein the number of the parallel surfaces 137 can be at least six. Therefore, it is favorable for the plastic barrel 100 to be applicable to the imaging lens module 5000 featured with single-focus and more lens elements. In the 5th embodiment, the number of the parallel surfaces 137 is eight. The other details of the plastic barrel 100 have been described in the foregoing paragraphs of the 1st embodiment and will not be described again herein.

In detail, the object-end hole 111 of the plastic barrel 100 can be an aperture stop of the optical lens assembly 5100. Therefore, it is favorable for simplifying the mechanical design complexity of the imaging lens module 5000. In the 5th embodiment, the object-end hole 111 is the aperture stop of the optical lens assembly 5100.

The wedge structures 140 cannot be in contact with the optical lens assembly 5100. Therefore, it is favorable for maintaining the structural integrity before and after assembling the plastic barrel 100 and the optical lens assembly 5100, so that the effect of reducing reflection of the imaging lens module 5000 is maintained.

In the 5th embodiment, the optical lens assembly 5100 includes, in order from the object-end portion 110 to the image-end portion 120, a first lens element 5101, a second lens element 5102, a third lens element 5103, a fourth lens element 5104, a fifth lens element 5105 and a sixth lens element 5106. In addition, the optical lens assembly 5100 can include other optical elements (their reference numerals are omitted) such as spacers, light blocking sheets and etc., wherein the first lens element 5101 to the sixth lens element 5106 are respectively abutted with the optical elements to be disposed in the plastic barrel 100.

In the 5th embodiment, the object-end portion 110 is extended from the part of the plastic barrel 100 for disposing the first lens element 5101 (the optical element closest to the imaged object) towards the imaged object (the part of the plastic barrel 100 for disposing the first lens element 5101 not included in the object-end portion 110). The image-end portion 120 is extended from the part of the plastic barrel 100 for disposing a spacer 5201 (the optical element closest to the image surface) towards the image surface (the part of the plastic barrel 100 for disposing the spacer 5201 not included in the image-end portion 120). The tube portion 130 is between the object-end portion 110 and the image-end portion 120 of the plastic barrel 100.

<6th Embodiment>

Figure 6:
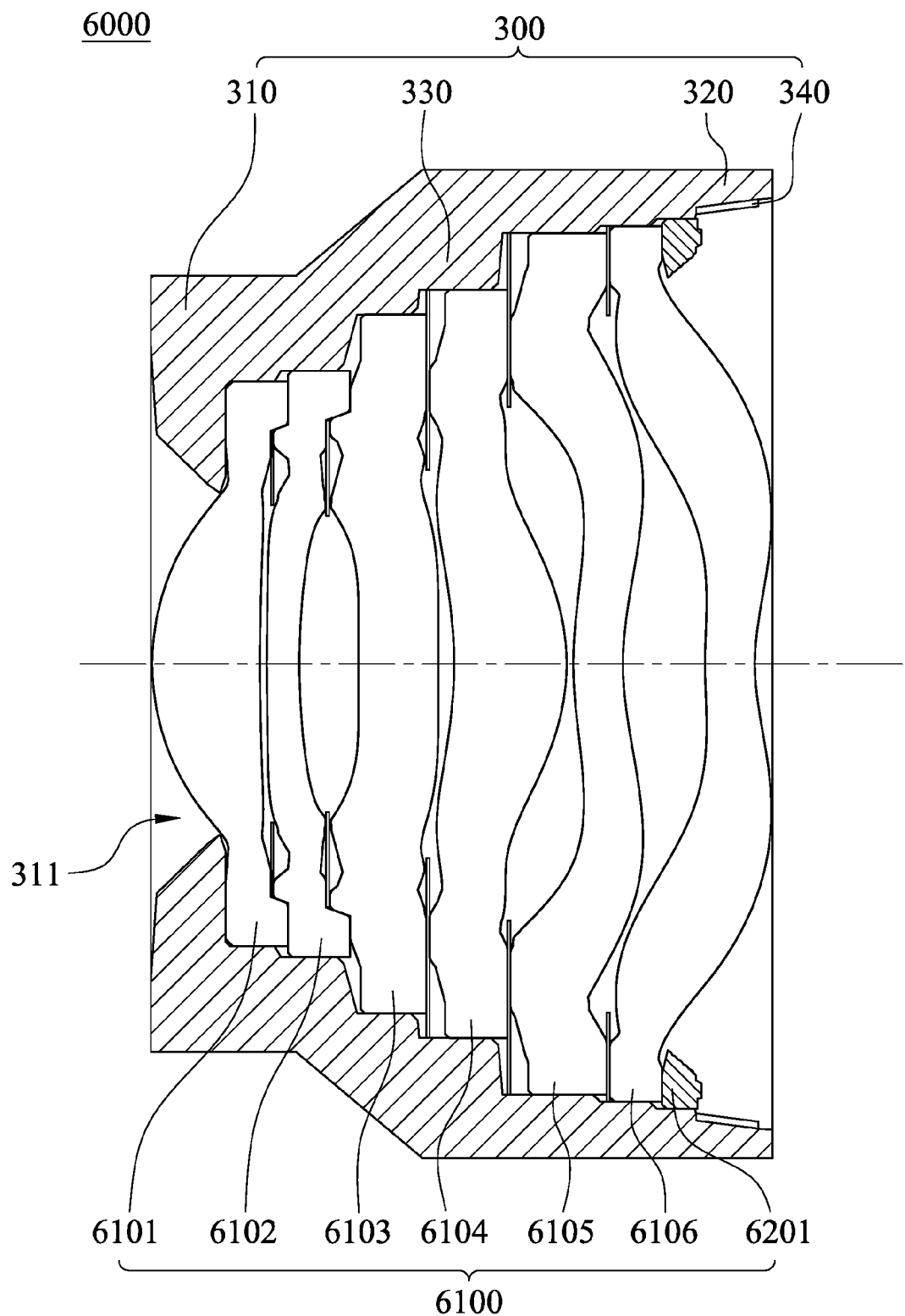
FIG. 6 is a schematic view of an imaging lens module according to the 6th embodiment of the present disclosure.

FIG. 6 is a schematic view of an imaging lens module 6000 according to the 6th embodiment of the present disclosure. In FIG. 6, the imaging lens module 6000 includes the plastic barrel 300 in the aforementioned 3rd embodiment and an optical lens assembly 6100.

The optical lens assembly 6100 is disposed in the plastic barrel 300 and includes lens elements (6101-6106). In other embodiments (not shown herein), the optical lens assembly 6100 can be disposed in another plastic barrel according to the present disclosure.

In FIG. 3A to FIG. 3C and FIG. 6, the plastic barrel 300 includes the object-end portion 310, the image-end portion 320, the tube portion 330 and the wedge structures 340. The object-end portion 310 includes the outer object-end surface 312, the object-end hole 311 and the inner annular object-end surface 315. The image-end portion 320 includes the outer image-end surface 322, the image-end opening 321 and the inner annular image-end surface 325. The tube portion 330 connects the object-end portion 310 and the image-end portion 320, and includes the inclined surfaces 336.

In the 6th embodiment, the wedge structures 340 are disposed on the inner annular image-end surface 325 and regularly arranged around the central axis of the plastic barrel 300 (i.e. an optical axis of the imaging lens module 6000). Each of the wedge structures 340 includes the acute end 348 and the tapered section 349. The tapered section 349 connects the inner annular image-end surface 325, which the wedge structure 340 is disposed on, and the acute end 348.

Furthermore, the wedge structures 340 are only disposed on the inner annular image-end surface 325. The number of the parallel surfaces 337 is seven. The other details of the plastic barrel 300 have been described in the foregoing paragraphs of the 3rd embodiment and will not be described again herein.

In detail, the object-end hole 311 is an aperture stop of the optical lens assembly 6100. The wedge structures 340 are not in contact with the optical lens assembly 6100.

In the 6th embodiment, the optical lens assembly 6100 includes, in order from the object-end portion 310 to the image-end portion 320, a first lens element 6101, a second lens element 6102, a third lens element 6103, a fourth lens element 6104, a fifth lens element 6105 and a sixth lens element 6106. In addition, the optical lens assembly 6100 includes other optical elements (their reference numerals are omitted) such as spacers, light blocking sheets and etc., wherein the first lens element 6101 to the sixth lens element 6106 are respectively abutted with the optical elements to be disposed in the plastic barrel 300.

In the 6th embodiment, the object-end portion 310 is extended from a part of the plastic barrel 300 for disposing the first lens element 6101 (the optical element closest to the imaged object) towards the imaged object (the part of the plastic barrel 300 for disposing the first lens element 6101 not included in the object-end portion 310). The image-end portion 320 is extended from a part of the plastic barrel 300 for disposing a spacer 6201 (the optical element closest to the image surface) towards the image surface (the part of the plastic barrel 300 for disposing the spacer 6201 not included in the image-end portion 320). The tube portion 330 is between the object-end portion 310 and the image-end portion 320 of the plastic barrel 300.

<7th Embodiment>

Figure 7:
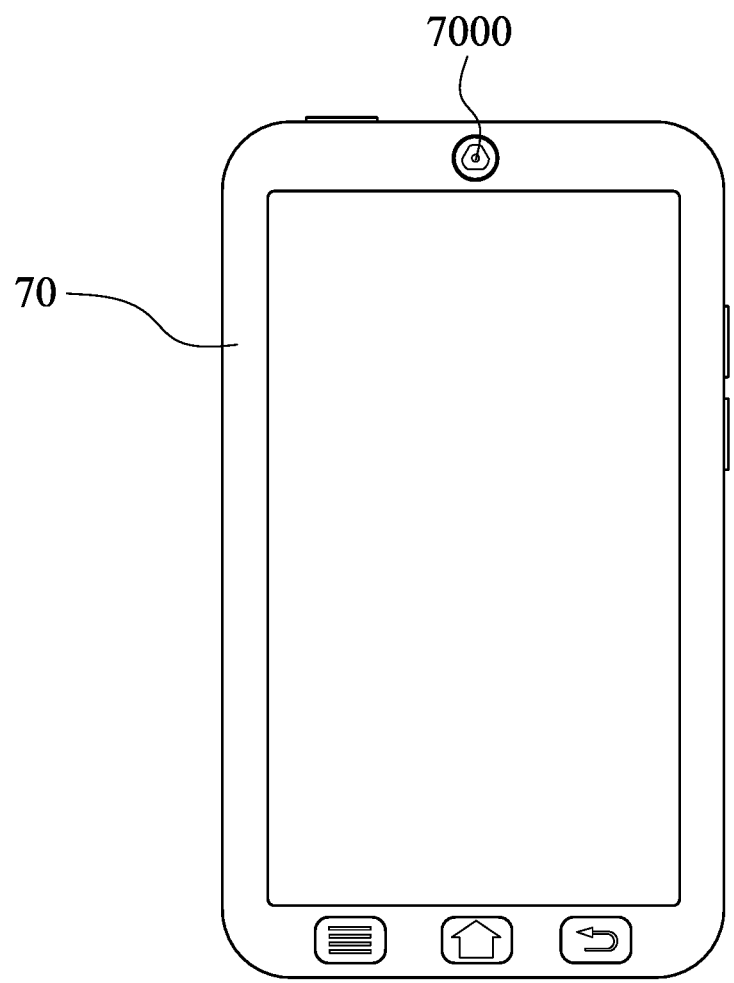
FIG. 7 shows an electronic device according to the 7th embodiment of the present disclosure.

FIG. 7 shows an electronic device 70 according to the 7th embodiment of the present disclosure. The electronic device 70 of the 7th embodiment is a smart phone, wherein the electronic device 70 includes an imaging lens module 7000. The imaging lens module 7000 includes a plastic barrel (not shown herein) according to the present disclosure. Therefore, it is favorable for effectively attenuating the reflected stray light and enhancing the image quality so as to satisfy the requirements of high-end optical systems with camera functionalities. Furthermore, the electronic device 70 can further include an image sensor (not shown herein), wherein the image sensor is disposed on an image surface (not shown herein) of the imaging lens module 7000. Preferably, the electronic device 70 can further include but not limited to a display, a control unit, a storage unit, a random access memory unit (RAM), a read-only memory unit (ROM) or a combination thereof.

<8th Embodiment>

Figure 8:
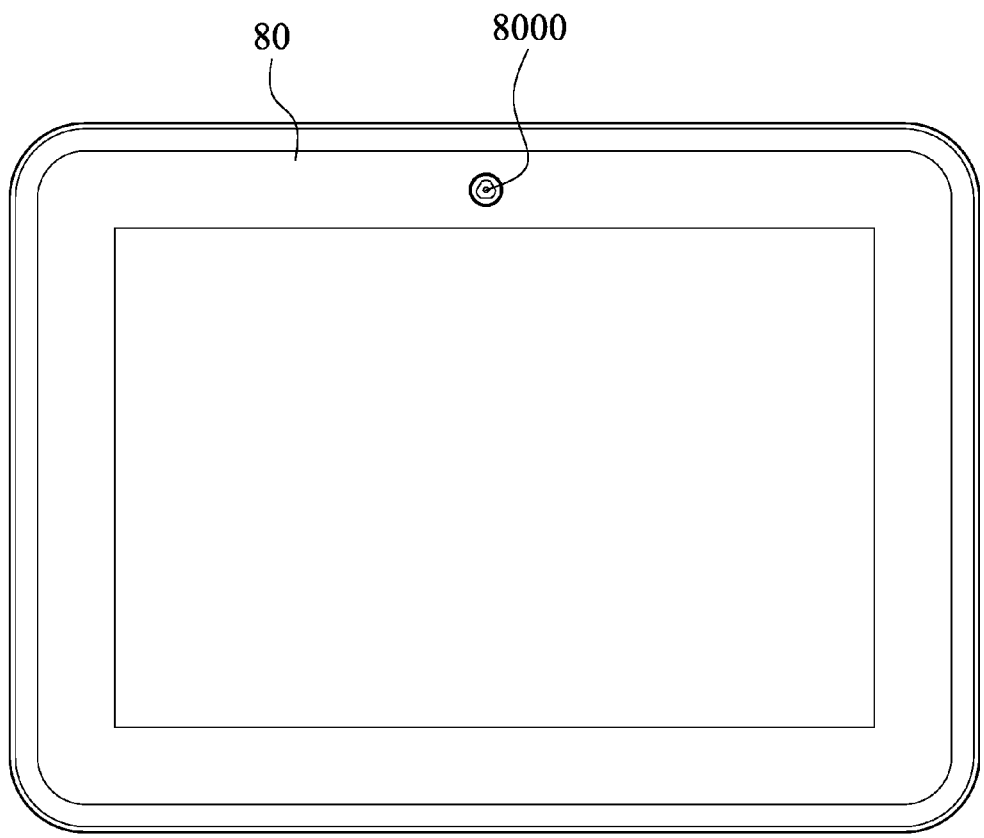
FIG. 8 shows an electronic device according to the 8th embodiment of the present disclosure.

FIG. 8 shows an electronic device 80 according to the 8th embodiment of the present disclosure. The electronic device 80 of the 8th embodiment is a tablet personal computer, wherein the electronic device 80 includes an imaging lens module 8000. The imaging lens module 8000 includes a plastic barrel (not shown herein) according to the present disclosure.

<9th Embodiment>

Figure 9:
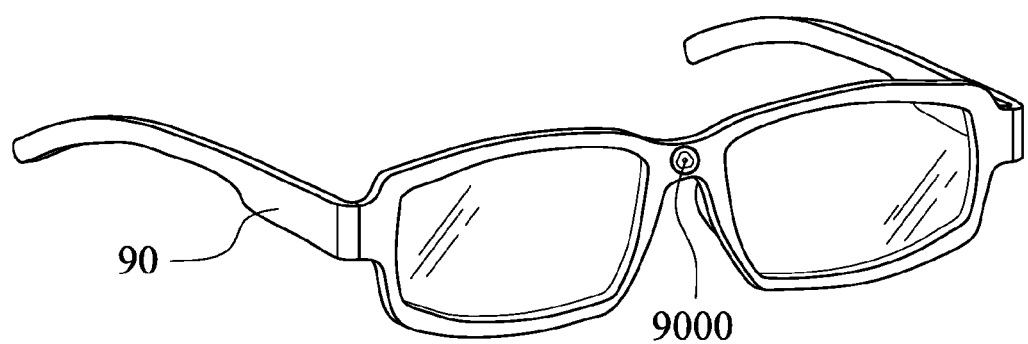
FIG. 9 shows an electronic device according to the 9th embodiment of the present disclosure.

FIG. 9 shows an electronic device 90 according to the 9th embodiment of the present disclosure. The electronic device 90 of the 9th embodiment is a wearable device, wherein the electronic device 90 includes an imaging lens module 9000. The imaging lens module 9000 includes a plastic barrel (not shown herein) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A plastic barrel, comprising:
   an object-end portion comprising:
      an outer object-end surface;
      an object-end hole; and
      an inner annular object-end surface connected to the outer object-end surface and surrounding the object-end hole;
   an image-end portion comprising:
      an outer image-end surface;
      an image-end opening; and
      an inner annular image-end surface connected to the outer image-end surface and surrounding the image-end opening;
   a tube portion connecting the object-end portion and the image-end portion, wherein the tube portion comprises:
      a plurality of inclined surfaces, wherein an angle is between each of the inclined surfaces and a central axis of the plastic barrel; and
   a plurality of wedge structures, which are disposed on at least one surface of the inner annular object-end surface, the inner annular image-end surface and the inclined surfaces, wherein the wedge structures are regularly arranged around the central axis, and each of the wedge structures is linearly disposed along a direction from the outer object-end surface toward the outer image-end surface and comprises:
      an acute end; and
      a tapered section connecting the surface, which the wedge structure is disposed on, and the acute end.

2. The plastic barrel of claim 1, wherein the plastic barrel with the wedge structures is formed integrally.

3. The plastic barrel of claim 2, wherein an angle between any two wedge structures adjacent to each other is θ, and the following condition is satisfied:
   35 degrees <θ<90 degrees.

4. The plastic barrel of claim 3, wherein the angle between any two wedge structures adjacent to each other is θ, and the following condition is satisfied:
   45 degrees <θ<75 degrees.

5. The plastic barrel of claim 3, wherein an angle between the inner annular image-end surface and the central axis is α, and the following condition is satisfied:

1. 0 degrees <α<27.0 degrees.

6. The plastic barrel of claim 5, wherein the angle between the inner annular image-end surface and the central axis is α, and the following condition is satisfied:

3. 0 degrees <α<19.0 degrees.

7. The plastic barrel of claim 2, wherein the outer image-end surface comprises a light diminishing surface, a surface roughness of the light diminishing surface is Ra, and the following condition is satisfied:

0. 1 μm <Ra <4.0 μm.

8. The plastic barrel of claim 2, wherein the wedge structures are only disposed on the inner annular image-end surface.

9. The plastic barrel of claim 2, wherein a number of the wedge structures is greater than or equal to 80, and smaller than or equal to 420.

10. The plastic barrel of claim 9, wherein the number of the wedge structures is greater than or equal to 150, and smaller than or equal to 360.

11. The plastic barrel of claim 2, wherein an entire surface of the acute end and an entire surface of the tapered section of each of the wedge structures are both smooth surfaces.

12. The plastic barrel of claim 2, wherein the tube portion further comprises:

a plurality of parallel surfaces parallel to the central axis, wherein a number of the parallel surfaces is at least six.

13. The plastic barrel of claim 1, wherein an outer diameter of the image-end portion is greater than a distance parallel to the central axis between the outer object-end surface and the outer image-end surface.

14. The plastic barrel of claim 1, wherein a cross-section orthogonal to the central axis of each of the wedge structures is isosceles triangle.

15. The plastic barrel of claim 1, wherein a distance between the surface, which the wedge structure is disposed on, and the acute end of each of the wedge structures is h, and the following condition is satisfied:

0. 03 mm <h <0.25 mm.

16. The plastic barrel of claim 1, wherein a distance between the surface, which the wedge structure is disposed on, and the acute end of each of the wedge structures is h, and the following condition is satisfied:

0. 04 mm <h <0.15 mm.

17. An imaging lens module, comprising:

the plastic barrel of claim 1; and an optical lens assembly disposed in the plastic barrel and comprising at least one lens element.

18. The imaging lens module of claim 17, wherein the object-end hole of the plastic barrel is an aperture stop of the optical lens assembly.

19. The imaging lens module of claim 17, wherein the wedge structures are not in contact with the optical lens assembly.

20. An electronic device, comprising:

the imaging lens module of claim 17.

* * * * *